United States Patent
Taylor et al.

[19]
[11] Patent Number: 6,158,289
[45] Date of Patent: *Dec. 12, 2000

[54] MULTIPLE ORIFICE ULTRASONIC METER FOR MEASURING FLOW OF SPECIFIC GRADES OF FUEL

[75] Inventors: Ken W. Taylor, Oakridge, N.C.; David A. Biedermann, Austin, Tex.

[73] Assignee: Dresser Industries, Inc., Dallas, Tex.

[*] Notice: This patent issued on a continued prosecution application filed under 37 CFR 1.53(d), and is subject to the twenty year patent term provisions of 35 U.S.C. 154(a)(2).

[21] Appl. No.: 09/176,735

[22] Filed: Oct. 21, 1998

Related U.S. Application Data

[60] Provisional application No. 60/062,947, Oct. 9, 1997.

[51] Int. Cl.[7] .................................. G01F 1/66; B67D 5/16; B67D 5/06
[52] U.S. Cl. ..................... 73/861.27; 222/71; 222/144.5
[58] Field of Search ............................ 73/861.28, 861.27, 73/861.26, 861.25, 861.23, 861.18, 861.77; 222/71, 75, 145.1, 144.5

[56] References Cited

U.S. PATENT DOCUMENTS

| | | |
|---|---|---|
| 3,731,777 | 5/1973 | Burke et al. . |
| 4,015,470 | 4/1977 | Morrison . |
| 4,195,517 | 4/1980 | Kalinoski et al. . |
| 4,320,659 | 3/1982 | Lynnworth et al. . |
| 4,462,261 | 7/1984 | Keyes et al. . |
| 4,508,127 | 4/1985 | Thurston ................................ 73/861.19 |
| 4,545,244 | 10/1985 | Yasuda et al. ........................ 73/861.28 |
| 4,557,148 | 12/1985 | Akiyama ............................... 73/861.28 |
| 4,646,575 | 3/1987 | O'Hair et al. . |
| 4,748,857 | 6/1988 | Nakagawa . |
| 5,090,252 | 2/1992 | Tschirner . |
| 5,105,666 | 4/1992 | Steinacher . |
| 5,214,966 | 6/1993 | Delsing . |
| 5,323,817 | 6/1994 | Spalding . |
| 5,332,011 | 7/1994 | Spalding . |
| 5,390,541 | 2/1995 | Feller ................................... 73/861.77 |
| 5,630,528 | 5/1997 | Nanaji . |
| 5,796,009 | 8/1998 | Delsing ................................. 73/861.28 |

*Primary Examiner*—Benjamin R. Fuller
*Assistant Examiner*—Jagdish Patel
*Attorney, Agent, or Firm*—Haynes and Boone, LLP

[57] ABSTRACT

A multiproduct fuel dispensing system for dispensing different grade fuels stored in several reservoir tanks. Several fuel delivery conduits deliver a specific grade of fuel from one or more of the reservoir tanks. Plural ultrasonic metering orifices are mounted in a single housing with shared electronic circuitry, and use sing-around measurement to measure flow. Each of the meters has a volume of about 50 cubic centimeters and a flow rate of about 10 gallons per minute. The housing is connected to the conduits to permit measurement of fuel flow through each meter.

15 Claims, 3 Drawing Sheets

MULTIPLE ORIFICE ULTRASONIC METER FOR MEASURING FLOW OF SPECIFIC GRADES OF FUEL

CROSS-REFERENCE RELATED DATA

This application claims the benefit of provisional patent application Ser. No. 60/062,927, filed on Oct. 21, 1997.

BACKGROUND

This invention relates to a multiproduct fuel dispenser and, more particularly, to such a dispenser that feeds more than one product through multiple ultrasonic metering orifices contained in a common housing with shared electronic circuitry, connected to multiple delivery hoses and nozzles, or a single hose and nozzle.

Many gasoline service stations require the installation of multiproduct fuel dispensers or pumps, each for dispensing a plurality of different grades, or octane levels, of gasoline products at each fueling point. Generally, three different products are provided per fueling point, namely a high octane fuel, a medium octane fuel and a low octane fuel. Some multiproduct dispensers use a separate hose for each product. Other such dispensers use the same hose and nozzle to dispense all products. Each dispenser usually provides a fueling point with either a single hose or multiple hoses on both sides of a fueling island. Mixing of these various products can result in the dilution or lowering of the octane level of the high and medium octane fuels which can lower the octane level of the fuel delivered to the customer. Testing procedures have therefore been developed in the United States to certify the octane levels of the fuels dispensed from commercial fuel dispensers. The testing and certification procedures are set forth in the National Conference on Weights and Measures Publication No. 12, entitled "Examination Procedure Outlines for Weighing and Measuring Devices". Pursuant to these testing guidelines, the person conducting the test is required to flush at least 0.3 gallons of fuel from the dispenser before taking the test sample. See page 57, line 1. Thus, in dispensers used at United States gasoline service stations, a slight mixing of the various fuel products of a multiproduct fuel dispenser may occur, so long as the contaminated product is flushed from the system during the first 0.3 gallons of discharge.

To avoid the mixing of the various products dispensed from a multiproduct fuel dispenser, known dispensers typically include a separate flow path for each product from its reservoir product tank which stores the fuel, to the outlet nozzle which introduces the fuel into the consumer's automobile. These systems therefore require the duplication of the components disposed between the tank and the nozzle for each fuel product, including the flow meter. In this manner, however, no contamination of the octane level of the products can occur. Through the use of such separate hoses, meters, etc., dispensers of the prior art avoid contamination of fuel being dispensed at a particular time, with fuel from a previous use that would otherwise remain in the system at the termination of the last dispensing cycle. Spalding, U.S. Pat. No. 5,332,011, a patent assigned to the assignee of the present invention, discloses such a dispenser, in which three nozzles, fuel hoses and flow meters, each for a different grade of gasoline, are combined in a single dispenser.

There are many disadvantages in the use of discrete delivery systems for each product fed through a multiproduct fuel dispenser. For example, the cost of such dispensers is increased due to the requirement for multiple hoses, nozzles and meters. Also, the overall size and space requirements of such a dispenser are increased due to the requirement to house the multiple components. In addition, and especially with respect to the flow meters, the cost of maintenance and repairs is increased for each discrete delivery system included in such dispensers.

In an effort to overcome some of the above problems, multiproduct fuel dispensers have been developed that comprise tri-axial fuel hoses having three concentric passages within a single hose that lead to a single nozzle. Such devices simplify operation for the consumer as there is only a single nozzle, but they do not alleviate the need for separate flow meters for each product or improve the maintenance and repair costs. Moreover, such devices might actually increase the cost of the dispenser due to the complexity of the tri-axial hoses.

Other multiproduct fuel dispensers have been developed in which the supply lines from each reservoir tank are manifolded into a single fuel hose downstream of the flow meter, which hose then leads to a single nozzle. Although this eliminates the cost of the multiplicity of nozzles and hoses, the problems associated with the multiplicity of flow meters, such as complexity, space limitations and repair and maintenance expenses, remain.

In one known device, different grades of fuel from three different storage sources can be delivered through a common meter and then dispensed through a dedicated hose and nozzle for each fuel grade. A specific valving arrangement controls the flow of a specific fuel grade through the meter and to the dedicated hose and nozzle. As an alternative, different grades of fuel from three different storage sources can be delivered through a common meter and then selectively dispensed through a single hose and nozzle. In this arrangement, valving selectively directs a specific fuel grade to the common meter and the meter is connected to the single hose and nozzle.

In another arrangement, fuel delivery of various grades through a single hose and nozzle is accomplished from two different grades of fuel (i.e., highest octane and lowest octane) stored separately. Here again, a specific valving arrangement controls the delivery of the selected fuel grade. The separately stored fuels may be blended to deliver one or more intermediate grades of fuel. This may be accomplished by proportional blending or fixed ratio blending. In proportional blending, various intermediate grades are a selectively blended mixture of some proportion of the high and low octane fuels. In fixed ratio blending, a single intermediate grade is produced including a fixed percentage of the high and low octane fuels.

In all blending dispensers there are two separate sets of hydraulics. One set is for controlling the low octane product input and another set is for controlling the high octane product input. In blending dispensers, whether of the proportional or fixed ratio type, the low and high octane hydraulic systems each contain a proportional flow control valve, or a variable orifice blending valve fed by the two separate products.

When any grade (low, high or blend) is selected, the blend ratio programmed into the dispensers computer determines the percentage or proportion of high grade product to be dispensed. When the low grade product is selected, the proportion or percentage of high grade product is 0%. When the high grade product is selected, the percentage of high grade product is 100%. When a blended grade is selected, a percentage of high grade product (less than 100%) is mixed with the remaining percentage of low grade product, and the combined total (100%) determines the octane rating of the blended grade.

Knowing the percentage or proportion of high grade, and thus low grade, product to dispense and by calculating the volume dispensed based on input signals from the pulsers, the computer signals the solenoid drive board which in turn controls the proportional flow control valves, or a dual orifice blend valve controlled by a stepper motor. Each proportional flow control valve continuously opens or closes, as directed by the solenoid drive board, to maintain the desired blend ratio and the maximum allowable flow rate.

A limitation with such arrangements is related to the 0.3 gallon limitation on multiproduct dispenser contamination. Components of the dispenser system which contribute to the contamination include the meter, the line between the meter and an outlet casting, the hose and the nozzle. Therefore, it is important to limit the volume of each component in order to stay within the 0.3 gallon limitation.

The present meter is a mechanical positive displacement meter using technology which is over 50 years old. This meter includes over 100 parts, is cumbersome, not service friendly, and not easily interfaced with modern microprocessor based control systems. Although some electronic flow sensing devices have been recently introduced, present meters are of too large a volume, e.g., in excess of about 0.1 gallons, which is one-third of the permissible 0.3 gallons. Volume of these meters is large to produce the desired system flow rate of 10 gallons per minute (gpm). This means that the other components of the system which contribute to product contamination must be limited to no more than 0.2 gallons.

Therefore, what is needed is an economically feasible meter of smaller volume, i.e., substantially less than 0.1 gallons, or a plurality of such meters in a single, smaller housing, each able to operate at the system flow rate of 10 gpm, reliable due to few or no moving parts, and capable of almost infinite life.

SUMMARY

One embodiment, accordingly, provides a multiproduct fuel dispensing system which has improved flow metering capabilities and avoids unwanted product contamination problems associated with presently used metering devices. To this end, an ultrasonic meter includes a housing having a plurality of orifices formed therein. Each orifice has a pair of ultrasonic transducers on opposite sides thereof. The transducers are electronically interconnected for producing an output signal for each orifice.

A principle advantage of this embodiment is that each ultrasonic meter orifice is of substantially small volume and is extremely reliable and capable of operating at the desired system flow rates. The multiple metering orifices are housed in a single assembly including shared electronic measurement and control circuitry. This embodiment improves previously known contamination problems while maintaining system efficiency, reduces cost and enhances system reliability and operational life.

DETAILED DESCRIPTION OF THE PREFERRED EMBODIMENT

Figure 1:
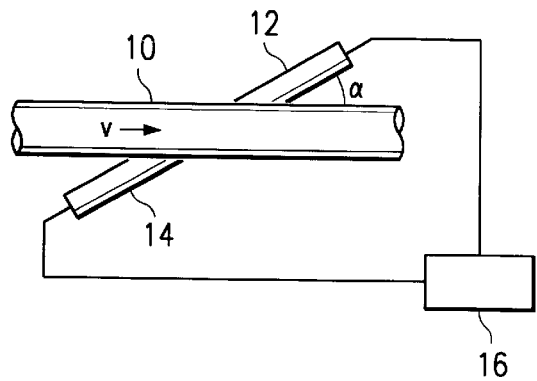
FIG. 1 is a schematic view illustrating an embodiment of an ultrasonic meter using the sing-around measurement technique.

FIG. 1 generally illustrates the principle of sing-around-type measurement. A fluid having the velocity v flows in a tube 10 from the left to the right. On each side of the tube 10, there is provided an ultrasonic transducer 12 and 14, respectively, which forms an angle a with the longitudinal axis of the tube 10. The transducers 12, 14 are interconnected by means of sing-around electronics, which are represented in the form of a box 16.

The velocity v of the fluid is measured in the tube 10. A sing-around loop is first established in the one direction by the sing-around electronics 16 exciting the transducer 12 to transmit an ultrasonic pulse, which is received by the transducer 14 after passing through the fluid in the tube 10. When detecting that the transducer 14 is receiving an ultrasonic pulse, the sing-around electronics 16 excite the transducer 12 to transmit a new ultrasonic pulse. The thus-established sing-around loop is maintained for a predetermined number of turns. Then, this procedure is repeated in the downstream direction.

The sing-around loop will oscillate with a certain period, which is referred to as the sing-around period and which depends on the sound velocity in the fluid between the transducers, the distance between the transducers, and the fluid velocity v. The sing-around period in the downstream direction is measured and the sing-around period in the upstream direction is measured. If the distance between the transducers, and the angle a between the respective transducers and the tube are known, and if the sing-around periods are measured, the fluid velocity v can thus be calculated and may be used for determining e.g. the flow rate of mass in the tube 10. With the aid of the sing-around periods, the sound velocity in the fluid may be calculated.

In actual practice, the sing-around periods are determined by measuring the time it takes for the ultrasonic pulses to do the predetermined number of turns in the sing-around loops, and dividing it by that predetermined number. When calculating the fluid velocity and the sound velocity, a time correction for the delays in the electronics is made.

Figure 2:
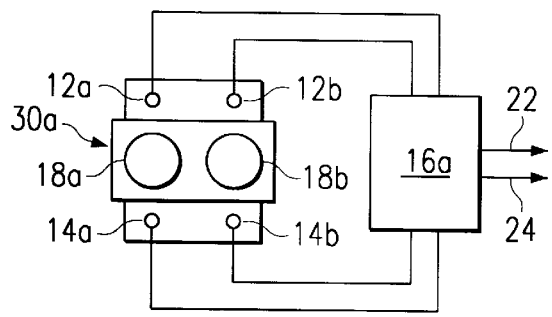
FIG. 2 is a schematic view illustrating an embodiment of a multiple orifice ultrasonic meter.

Referring now to FIG. 2, an exemplary multiple orifice ultrasonic meter is illustrated and generally referred to by reference numeral 30a. A pair of orifices 18a and 18b contain all the elements depicted in FIG. 1, i.e. a pair of ultrasonic transducers 12a, 14a and 12b, 14b, on each side of orifice 18a and orifice 18b, respectively. The transducers 12a, 14a of orifice 18a are interconnected by means of sing-around electronics, which are represented in the form of box 16a. Also, the transducers 12b, 14b of orifice 18b are interconnected by means of sing-around electronics, which are represented in the form of box 16a. It is recognized that some, but not all, of the electronics in box 16a can be shared due the need to separate some of the data as evidenced by a pair of output signals 22, 24 from box 16a.

Figure 3:
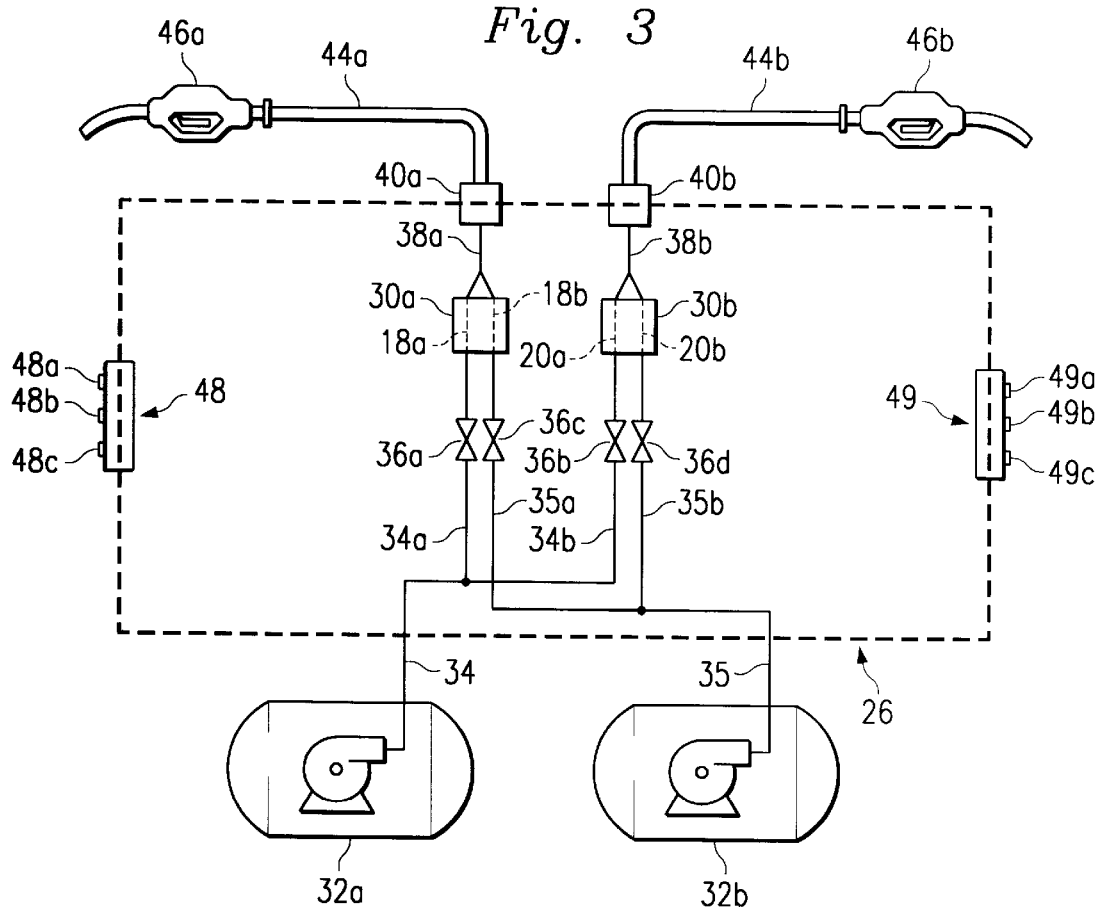
FIG. 3 is a schematic view illustrating an embodiment of a two fueling point blend dispensing system, wherein multiple fuel grades are dispensed through the same hose and nozzle.

Referring to FIG. 3, a two fueling point dispenser is illustrated schematically and generally referred to by reference numeral 26. The dispenser 26 receives fuel from a plurality of underground fuel reservoir tanks 32a and 32b, each of which stores a different grade of fuel such as a high octane in one tank and a low octane in the other tank. Also, a pair of separate fuel delivery lines 34, 35 pass the fuel from the reservoir tanks 32a, 32b, respectively, into the dispenser 26. In the dispenser 26, fuel line 34 divides into a fuel line 34a and a fuel line 34b. Line 34a delivers fuel from reservoir tank 32a to orifice 18a of flow meter 30a under the control of a flow valve 36a, and line 34b delivers fuel from reservoir tank 32a to an orifice 20a of a similar flow meter 30b under the control of a flow valve 36b. Also, in the dispenser 26, fuel line 35 divides into a fuel line 35a and a fuel line 35b. Line 35a delivers fuel from reservoir tank 32b to orifice 18b of flow meter 30a under the control of a flow valve 36c, and line 35b delivers fuel from reservoir tank 32b to an orifice 20b of flow meter 30b under the control of a flow valve 36d.

In this manner, meter 30a receives fuel from either of the reservoir tanks 32a or 32b, separately, or blended fuel from reservoir tanks 32a and 32b simultaneously. The fuel is then delivered from meter 30a to a fuel delivery line 38a which passes the fuel to an outlet casting 40a. The meter 30b receives fuel from either of the reservoir tanks 32a or 32b separately, or blended fuel from reservoir tanks 32a and 32b simultaneously. The fuel is then delivered from meter 30b to a fuel delivery line 38b which passes fuel to an outlet casting 40b. A flexible hose 44a extends from the outlet casting 40a and terminates at a nozzle 46a provided for insertion into a customer's fuel tank (not shown) on one side of a refueling island, whereas another flexible hose 44b extends from outlet casting 40b and terminates in a nozzle 46b provided for insertion into another customer's fuel tank (also not shown) on another or opposite side of the refueling island.

A product selection panel 48 is provided with a plurality of selection buttons 48a, 48b, 48c, for one side of the dispenser island and a panel 49 is provided with a plurality of selection buttons 49a, 49b, 49c for another side of the dispenser island. The buttons 48a, 48b, 48c, 49a, 49b, 49c, correspond to either one of the two grades of fuel or a blend of the two grades available through the dispenser 26, and together with nozzles 46a, 46b, respectively, control the operation of the flow control valves 36a, 36b, 36c, 36d in a conventional manner to allow the customer to select the desired grade of fuel from the reservoir tanks 32a and 32b.

Figure 3A:
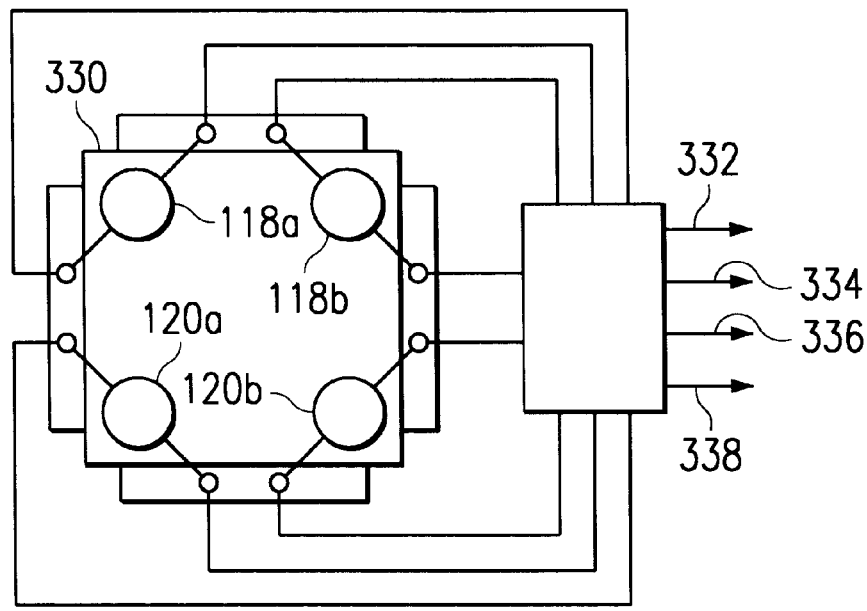
FIG. 3A is a schematic view illustrating another embodiment of a multiple orifice ultrasonic meter.

The ultrasonic flow meter 30a, FIG. 2, generates output signals 22, 24 in proportion to the gasoline flow through orifice 18a and through orifice 18b of the meter 30a, respectively, to allow the customer to control the total amount of fuel dispensed. However, as opposed to flow meters of known multiproduct fuel dispensers, the fuel meter 30a has a small internal volume in each orifice 18a, 18b, such that no more than 0.1 gallons of fuel remains in either orifice 18a, 18b after use of the dispenser 26 as is described below. The same sequence occurs in ultrasonic flow meter 30b, FIG. 3. Alternatively, it is possible to combine the elements of meters 30a and 30b in a single housing with shared electronics, see FIG. 3A for example wherein a housing 330 includes a plurality of orifices 118a, 118b, 120a and 120b, and four output signals 332, 334, 336 and 338.

It should be understood that the dispenser 26 contains two identical fueling stations on opposing sides to service two customers at a time, each having a fuel delivery system as just described for dispensing fuel from either or both of the reservoir tanks 32a and 32b. In addition, it should be emphasized that because FIG. 2 is merely a schematic representation of the basic components of the assembly of the present invention, the exact location, size and lengths of the components can vary within the scope of the invention. For example, the fuel meters 30a and 30b can be disposed in closer proximity to the outlet castings 40a, 40b, FIG. 3, to reduce the length of the fuel delivery lines 38a, 38b in order to further reduce the amount of fuel remaining in the dispenser after use.

The operation of the dispenser 26 permits customers to select a desired grade of fuel from the product selection panels 48, 49, by pressing an appropriate one of the buttons 48a, 48b, 48c, 49a, 49b, 49c, respectively. This selection is electronically transferred from the product selection panels 48, 49 to one or more of the appropriate flow control valves 36a, 36b, 36c, 36d in a conventional manner. Then, when there is customer activation of one or both nozzles 46a, 46b, the appropriate flow control valve or valves 36a, 36b, 36c, 36d open, thereby allowing fuel from the selected reservoir tank 32a and/or 32b to travel through its associated fuel delivery line 34, 35, into the fuel delivery lines 34a, 34b, 35a, 35b, and into the fuel meters 30a and 30b. The fuel meters 30a and 30b track the amount of fuel flowing through the line, and thus the amount flowing into the customer's fuel tank via the hoses 44a, 44b and the nozzles 46a, 46b to enable the dispenser 26 to calculate the cost of the dispensed fuel. When the customer's fuel tank is full, or any time that the customer desires to stop the fuel delivery by deactivating the nozzles 46a, 46b, the activated flow control valve or valves 36a, 36b, 36c, 36d close to stop the flow of fuel from the selected reservoir tank 32a and/or 32b.

Upon the stoppage of fuel delivery, the selected fuel delivery line, flow control valves, the fuel meter, the hoses, and the nozzles, all remain full of fuel. The potentially contaminating portion of fuel remaining in the dispenser 26 is equal to or less than 0.3 gallons of fuel due to the reduced internal volume of the fuel meters 30a and 30b. In this manner, even if the next customer selects a different grade of fuel, only a slight commingling of fuels will occur. Thus, the dispenser 26 can pass the United States National Conference on Weights and Measures testing and certification procedures for octane certification as the remaining fuel will be flushed from the dispenser 26 within allowable limits.

The multiproduct fuel dispenser 26 of the present invention thus provides several benefits and technical advantages over prior art dispensers. Foremost, by employing fuel meters 30a and 30b, both the original cost, and the expected repair and maintenance costs of the dispenser 26 are reduced due to the elimination of relatively expensive and high maintenance component parts, such as multiple fuel meters. Moreover, as parts have been eliminated, the overall size and space requirements of the dispenser 26 are reduced. These benefits and advantages are achieved with a multiproduct fuel dispenser that still passes the United States octane certification procedures as no more than 0.3 gallons of fuel remain in the dispenser 26 that can be commingled with fuels of different octane levels.

Figure 4:
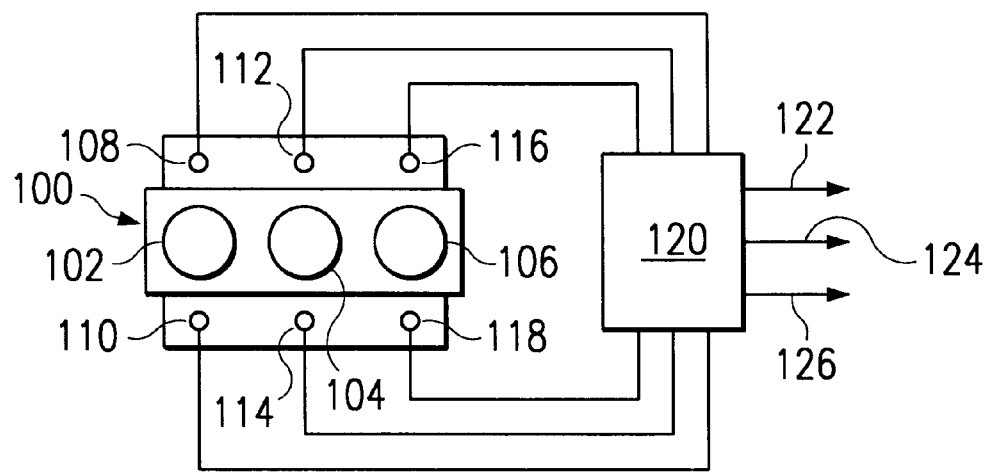
FIG. 4 is a schematic view illustrating an embodiment of another multiple orifice ultrasonic meter.

Referring now to FIG. 4, a multiple orifice ultrasonic meter is illustrated and generally referred to by reference numeral 100. A plurality of orifices 102, 104, 106, contain equivalent elements depicted in FIG. 1, i.e. a pair of transducers 108, 110 on each side of orifice 102, a pair of transducers 112, 114 on each side of orifice 104, and a pair of transducers 116, 118 on each side of orifice 106. The transducers 108, 110 of orifice 102 are interconnected by means of sing-around electronics, which are represented in the form of box 120. The transducers 112, 114 of orifice 104 are similarly interconnected as are the transducers 116, 118, of orifice 106. It is recognized that most but not all of the electronics in box 120 can be shared because only one of a plurality of output signals 122, 124, 126, from box 120 is required for each customer transaction. A fuel measurement consequently would only be required from one of the orifices 102, 104 or 106 for any one delivery.

Figure 5:
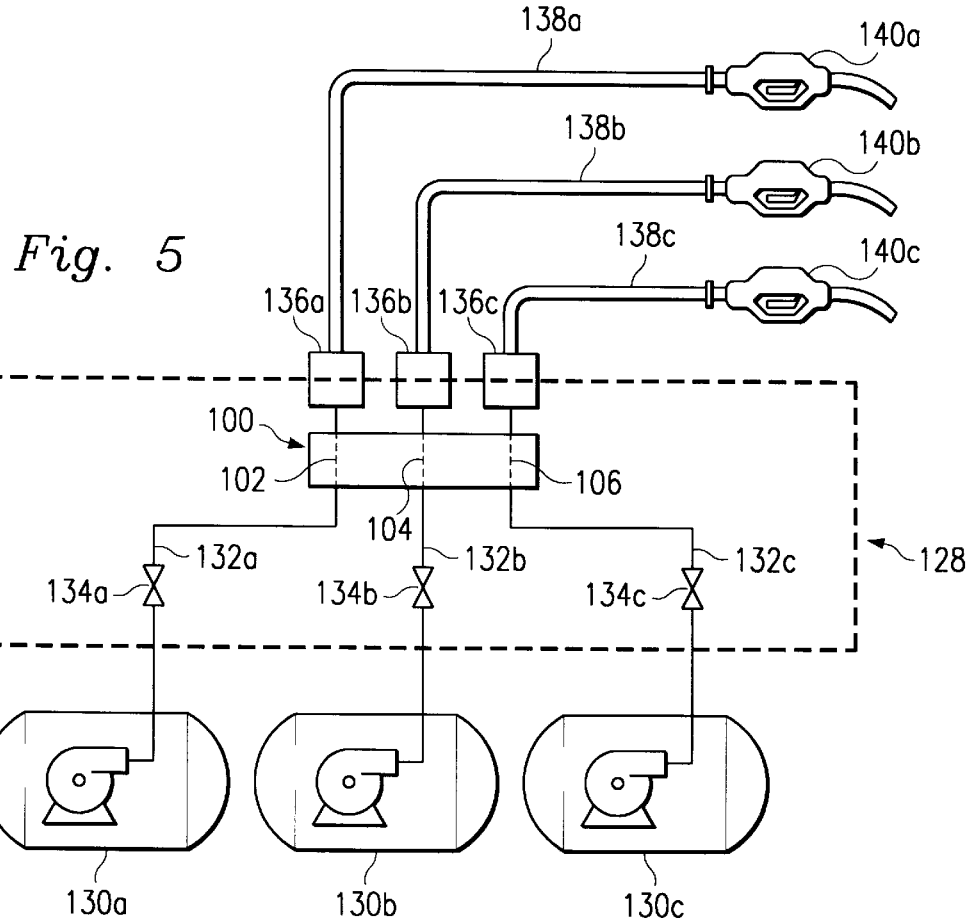
FIG. 5 is a schematic view illustrating an embodiment of a fuel dispensing system wherein multiple fuel grades are each dispensed through a separate hose and nozzle.

Referring to FIG. 5, a multiproduct fuel dispenser is illustrated schematically and generally referred to by reference numeral 128. The dispenser receives fuel from a plurality of underground fuel reservoir tanks 130a, 130b and 130c, each of which stores a different grade of fuel such as a high grade in tank 130a, a medium grade in tank 130b and a low grade in tank 130c. A plurality of separate fuel lines 132a, 132b, 132c pass the fuel from the reservoir tanks 130a, 130b, 130c, into the dispenser 128, under the control of a plurality of flow control valves 134a, 134b, 134c, respectively. Each fuel line 132a, 132b and 132c delivers fuel to a respective orifice 102, 104, 106 of flow meter 100, from which the fuel flows to a respective outlet casting 136a, 136b, 136c. A flexible hose 138a, 138b, 138c extends from a respective one of the outlet castings 136a, 136b, 136c and terminates at a respective nozzle 140a, 140b, 140c, provided for insertion into a customer's fuel tank (not shown) on only one side of a refueling island.

Figure 6:
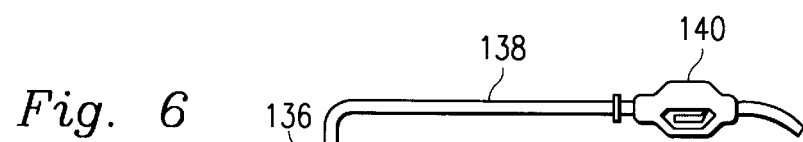
FIG. 6 is a schematic view illustrating another embodiment of a fuel dispensing system wherein multiple fuel grades are dispensed through a single hose and nozzle.

The multiproduct fuel dispenser illustrated in FIG. 5 can also be modified to a single hose arrangement, see FIG. 6. The dispenser 128 receives fuel from the underground reservoir tanks 130a, 130b, 130c. The separate fuel lines 132a, 132b, 132c, pass the fuel from the reservoir tanks 130a, 130b, 130c into the dispenser 128, under the control of flow control valves 134a, 134b, 134c, respectively. Each fuel line 132a, 132b and 132c delivers fuel to the respective orifices 102, 104, 106 of the flow meter 100, from which the fuel flows to a single outlet casting 136. A flexible hose 138 extends from the outlet casting 136 and terminates at a nozzle 140, provided for insertion into a customer's fuel tank (not shown) on only one side of a refueling island.

A product selection panel 142 is provided with a plurality of selection buttons 142a, 142b, 142c which correspond to the grades of fuel in the reservoir tanks 130a, 130b, 130c respectively, available through the dispenser 128, and together with the nozzle 140 controls the operation of the flow control valves 134a, 134b, 134c, respectively, in a conventional manner to allow the customer to select the desired grade of fuel from the reservoir tanks 130a, 130b, 130c which is delivered through the dedicated hose 138 and the nozzle 140, respectively. The ultrasonic flow meter 100 generates the output signals 122, 124 and 126, FIG. 4, in proportion to the gasoline flow through the orifices 102, 104, 106 of the meter 100, respectively, to allow the customer to control the total amount of fuel dispensed.

The operation of dispenser 128, FIG. 6, permits customers to select a desired grade of fuel from the product selection panel 142 by pressing an appropriate one of the buttons 142a, 142b, 142c. This selection is electronically transferred from the product selection panel 142 to one of the appropriate flow control valves 134a, 134b, 134c, respectively, in a conventional manner. Then, when there is customer activation of nozzle 140, a respective flow control valve 134a, 134b, 134c opens, thereby allowing fuel from the associated reservoir tank 130a, 130b, 130c to travel through its respective fuel delivery line 132a, 132b, 132c and into the fuel meter 100. The fuel meter 100 tracks the amount of fuel flowing through the line, and thus the amount flowing into the customer's fuel tank via the associated hose and nozzle to enable the dispenser 128 to calculate the cost of the dispensed fuel. When the customer's fuel tank is full, or any time that the customer desires to stop the fuel delivery by deactivating the associated nozzle, the flow control valve associated with that nozzle closes to stop the flow of fuel from the selected reservoir tank. The operation of the dispenser 128 of FIG. 5 is the same except that no product selection panel is required in the three hose arrangement. This is because activation of any nozzle 140a, 140b, 140c will open an associated flow control valve 134a, 134b, 134c, respectively.

The multiproduct fuel dispenser 128 thus provides several benefits and technical advantages over known dispensers. Foremost, by employing a single, multiple orifice common fuel meter 100, both the original cost and the expected repair and maintenance costs of dispenser 128 are reduced due to the elimination of relatively expensive and high maintenance component parts, such as multiple fuel meters.

As a result, one embodiment provides an ultrasonic meter including a housing having a plurality of orifices formed therein. Each orifice has a pair of ultrasonic transducers on opposite sides thereof. The transducers are electronically interconnected for producing an output signal for each orifice.

Another embodiment provides a multiproduct fuel dispensing system for dispensing a plurality of fuels stored in a plurality of reservoir tanks. A plurality of fuel delivery conduits are connected for delivering a specific grade of fuel from a respective one of the reservoir tanks. An ultrasonic meter has a plurality of ultrasonic metering orifices mounted in a single housing with shared electronic circuitry. The housing has multiple inlets and outlets connected to the conduits to permit measurement of fuel flow through each orifice.

Another embodiment provides a multiproduct fuel dispensing system including a plurality of reservoir tanks each containing a specific grade of fuel. A plurality of fuel delivery conduits are each connected for delivering fuel from a respective one of the reservoir tanks. An ultrasonic meter includes a housing having a plurality of metering orifices formed therein. Each orifice is connected to one of the fuel delivery conduits. Each orifice has a pair of ultrasonic transducers on opposite sides thereof. The transducers are electronically interconnected for providing an output signal for each orifice.

A further embodiment provides a method of dispensing multiple fuel products including connecting a fuel delivery conduit to a respective reservoir tank. Each tank contains a specific grade of fuel. Each conduit is connected to a respective ultrasonic metering orifice in an ultrasonic meter housing. A pair of ultrasonic transducers are connected on opposite sides of each orifice. Each transducer pair is electronically interconnected for providing an output signal for each orifice.

As it can be seen, the principal advantages of these embodiments are that each ultrasonic meter orifice is of small volume, has high reliability and operates at a desired system flow rate. Because multiple meters are disposed in a single housing, contamination is reduced, system efficiency is maintained and original and ongoing costs are reduced.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An ultrasonic meter comprising:

an ultrasonic meter housing;

a plurality of separated metering orifices formed in the meter housing extending through the meter housing, each orifice having a pair of ultrasonic transducers on opposite sides thereof;

a specific grade of fuel being confined to a respective one of the orifices so that there is no fuel contamination in the meter housing; and a sing-around electronic circuitry interconnected to the transducers to measure a flow of the specific grade of fuel through the respective one of the orifices.

2. The meter as defined in claim 1 wherein the meter includes a pair of orifices.

3. The meter as defined in claim 1 wherein the meter includes three orifices.

4. The meter as defined in claim 1 wherein the meter includes four orifices.

5. A multiproduct fuel dispensing system for dispensing a plurality of fuels stored in a plurality of reservoir tanks, each tank containing a specific grade of fuel, comprising:

a plurality of fuel delivery conduits each connected to deliver said specific grade of fuel from a respective one of the reservoir tanks;

an ultrasonic meter housing having a plurality of separated metering orifices formed therein and extending through the meter housing, each orifice being connected to a respective one of the fuel delivery conduits, each orifice having a pair of ultrasonic transducers on opposite sides thereof, said specific grades of fuel flowing to a respective one of the orifices;

one of the specific grades of fuel passing through one of the orifices and another one of the specific grades of fuel passing through another one of the orifices so that there is no fuel contamination in the meter housing; and a sing-around electronic circuitry interconnected to the transducers to measure a flow of the specific grades of fuel, flowing through a respective one of the orifices.

6. The multiproduct fuel dispensing system as defined in claim 5 wherein each of the plurality of separated metering orifices has a volume of about 50 cubic centimeters.

7. The multiproduct fuel dispensing system as defined in claim 6 wherein each of the plurality of separated metering orifices has a flow rate of about 10 gallons per minute.

8. A multiproduct fuel dispensing system comprising:

a plurality of reservoir tanks each containing a specific grade of fuel;

a plurality of fuel delivery conduits, each connected to deliver said specific grade of the fuel from a respective one of the reservoir tanks;

an ultrasonic meter housing having a plurality of separated metering orifices formed therein and extending through the meter housing, each orifice being connected to a respective one of the fuel delivery conduits, each orifice having a pair of ultrasonic transducers on opposite sides thereof, said specific grades of fuel flowing to a respective one of the orifices;

one of the specific grades of fuel passing through one of the orifices and another one of the specific grades of fuel passing through another one of the orifices so that there is no fuel contamination in the meter housing; and a sing-around electronic circuitry interconnected to the transducers to measure a flow of the specific grades of fuel flowing through a respective one of the orifices.

9. The system as defined in claim 8 wherein the meter housing includes a pair of orifices.

10. The system as defined in claim 8 wherein the meter housing includes three orifices.

11. The system as defined in claim 8 wherein the meter housing includes four orifices.

12. The system as defined in claim 8 wherein each of the plurality of separated metering orifices has a volume of about 50 cubic centimeters.

13. The system as defined in claim 8 wherein each of the plurality of separated metering orifices has a flow rate of about 10 gallons per minute.

14. The system as defined in claim 8 wherein said plurality of separated metering orifices is connected to a single dispensing nozzle.

15. The system as defined in claim 8 wherein said plurality of separated metering orifices is connected to a plurality of dispensing nozzles.

* * * * *

UNITED STATES PATENT AND TRADEMARK OFFICE
CERTIFICATE OF CORRECTION

PATENT NO.    : 6,158,289
DATED         : December 12, 2000
INVENTOR(S)   : Taylor et al.

It is certified that error appears in the above-identified patent and that said Letters Patent is hereby corrected as shown below:

Title page,
Item [*] Notice, insert -- Subject to any disclaimer, the term of this patent is extended or adjusted under 35 U.S.C. 154(b) by 35 days --

Signed and Sealed this

Fifth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,158,289
DATED : December 12, 2000
INVENTOR(S) : Taylor et al.

It is certified that error appears in the above-identified patent and that said Letters Patent is hereby corrected as shown below:

<u>Title page,</u>
Item [60], Related U.S. Application Data, replace "60/062,947, Oct. 9, 1997" with -- 60/062,927, Oct. 21, 1997 --.

Signed and Sealed this

Thirteenth Day of September, 2005

JON W. DUDAS
*Director of the United States Patent and Trademark Office*